United States Patent
Masuta

(10) Patent No.: US 8,754,598 B2
(45) Date of Patent: Jun. 17, 2014

(54) MOTOR DRIVE APPARATUS FOR BRUSHLESS MOTOR

(75) Inventor: Hiromasa Masuta, Hirosaki (JP)

(73) Assignees: Canon Kabushiki Kaisha (JP); Canon Precision Inc. (JP)

( * ) Notice: Subject to any disclaimer, the term of this patent is extended or adjusted under 35 U.S.C. 154(b) by 74 days.

(21) Appl. No.: 13/416,039

(22) Filed: Mar. 9, 2012

(65) Prior Publication Data

US 2012/0235608 A1    Sep. 20, 2012

(30) Foreign Application Priority Data

Mar. 16, 2011  (JP) .................. 2011-058046

(51) Int. Cl.
*H02P 21/00*  (2006.01)
*H02P 27/00*  (2006.01)

(52) U.S. Cl.
USPC ............. 318/400.02; 318/721; 318/798

(58) Field of Classification Search
USPC ............... 318/400.02, 721, 798
See application file for complete search history.

(56) References Cited

U.S. PATENT DOCUMENTS

| 5,723,957 | A |   | 3/1998 | Ishikawa |
| 6,081,087 | A | * | 6/2000 | Iijima et al. ............. 318/400.13 |
| 6,534,948 | B2 | * | 3/2003 | Ohura et al. ................ 318/798 |
| 7,114,933 | B2 | * | 10/2006 | Adachi et al. ..................... 425/3 |

FOREIGN PATENT DOCUMENTS

JP      07-250492 A      9/1995

* cited by examiner

*Primary Examiner* — Eduardo Colon Santana
*Assistant Examiner* — Gabriel Agared
(74) *Attorney, Agent, or Firm* — Rossi, Kims & McDowell LLP

(57) ABSTRACT

A motor drive apparatus that can be used to drive a wide range of brushless motors without any limit to a magnetic pole number of a rotor magnet. One rotational period T of the rotor magnet is obtained, and one period S of the sine wave drive signal according to a mathematical expression of $S=T/(n/2)$. The one period S of the sine wave drive signal is updated at intervals of one period of the output signal from one magnetic pole detecting element among the three magnetic pole detecting elements.

1 Claim, 3 Drawing Sheets

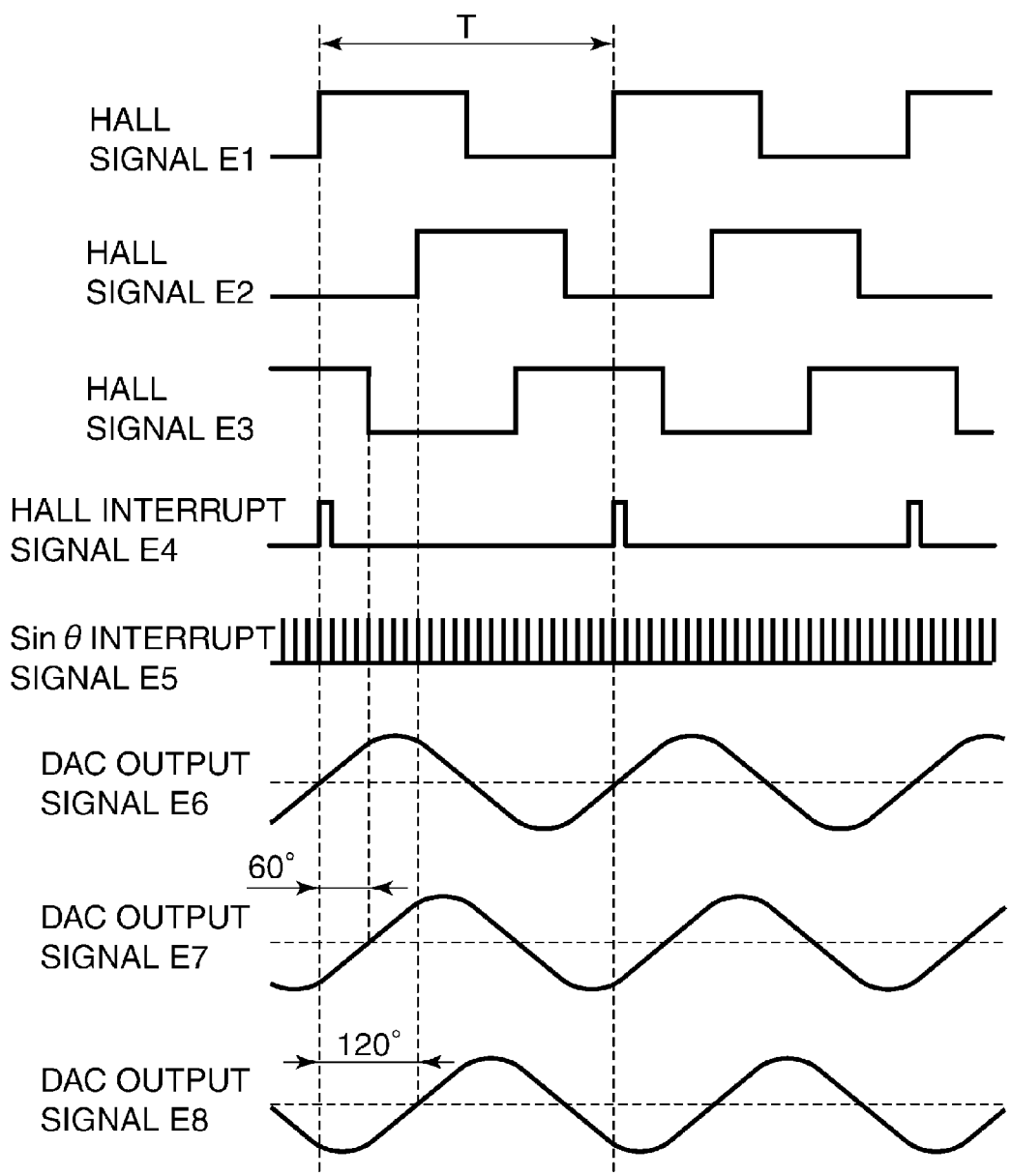

MOTOR DRIVE APPARATUS FOR BRUSHLESS MOTOR

BACKGROUND OF THE INVENTION

1. Field of the Invention

The present invention relates to a motor drive apparatus that drives a brushless motor.

2. Description of the Related Art

For products powered by a brushless motor, there has been a growing demand for vibration reduction, noise reduction, torque ripple reduction, and so on. As a brushless motor drive method meeting this demand, a sine wave drive system that drives a brushless motor by supplying a sinusoidal drive current to a drive winding of the brushless motor (see, for example, Japanese Laid-Open Patent Publication (Kokai) No. H07-250492).

FIG. 3 is a timing chart of drive waveforms for a brushless motor based on a common sine wave drive system, and the drive waveforms are based on the assumption that a three-phase four-pole brushless DC motor is driven. Among hall signals E1, E2, and E3 which are output signals from three magnetic pole detecting elements (not shown), only the hall signal E1 is used, and a hall interrupt signal E4 is generated. Here, one period of the hall signal E1 is a period over which the north pole and the south pole of a rotor magnet are detected, and hence the hall interrupt signal E4 is output at intervals of one period of the hall signal E1. The hall interrupt signal E4 is divided in 24 by a divided period computing unit (not shown), and a Sin θ interrupt signal E5 is output.

In synchronization with the Sin θ interrupt signal E5, 24 sine wave amplitude values are supplied to a DA converter, and a DAC output signal E6 which is a one-phase sine wave drive signal is output. A sine wave amplitude value which lags by an electric angle of 60 degrees and a sine wave amplitude value which lags by an electric angle of 120 degrees are supplied to the DA converter, and a DAC output signal E7 and a DAC output signal E8 are output. Thus, sine wave drive signals less affected by variations in the locations at which magnetic pole detecting elements are placed can be output.

However, in an arrangement having a rotor magnet with four or more poles, even when the rotor magnet is rotating at a uniform speed, variations in the period of a hall signal detected by a magnetic pole detecting element are caused by lack of accuracy of division in magnetization of the rotor magnet. For this reason, in the method in which one period of a sine wave drive signal is output from one period of a magnetic pole detecting element, variations in the period of a sine wave drive signal occur. Moreover, when resolution for sine wave amplitude values is low, variations in sine wave amplitude values increase with each period of a magnetic pole detecting element, which causes torque ripples to unfavourably occur.

To solve the above described problems, it is necessary to increase the accuracy of division in magnetization of the rotor magnet and the resolution of sine wave amplitude values, but to satisfy this requirement, the arrangement of a motor drive apparatus has to be complicated, resulting in an increase in the cost of the motor and the motor drive apparatus. Moreover, because the motor drive apparatus is required to have an arrangement suitable for the number of magnetic poles of the rotor magnet, the motor drive apparatus cannot be made versatile.

SUMMARY OF THE INVENTION

The present invention provides a motor drive apparatus that can be used to drive a wide range of brushless motors without any limit to a magnetic pole number of a rotor magnet.

Accordingly, an aspect of the present invention provides a motor drive apparatus that drives, by a sine wave drive signal, a three-phase n-pole brushless motor having a rotor magnet including a coil unit and magnets with a magnetic pole number n fixed to a rotary shaft, and three magnetic pole detecting elements that detect a rotational position of the rotor magnet, comprising: an obtaining unit configured to obtain one rotational period T of the rotor magnet; and a period updating unit configured to obtain one period S of the sine wave drive signal according to a mathematical expression of $S=T/(n/2)$, and update the one period S of the sine wave drive signal at intervals of one period of the output signal from one magnetic pole detecting element among the three magnetic pole detecting elements.

According to the present invention, it is possible to cancel out variations in the period of a hall signal detected by the magnetic pole detecting element, which are caused by lack of accuracy of division in magnetization.

Accordingly, the motor drive apparatus according to the present invention can be used to drive a wide range of brushless motors without any limit to the number of magnetic poles of the rotor magnet.

Further features of the present invention will become apparent from the following description of exemplary embodiments (with reference to the attached drawings).

BRIEF DESCRIPTION OF THE DRAWINGS

FIG. 3 is a timing chart of drive signals for a brushless motor based on a common sine wave drive system.

DESCRIPTION OF THE EMBODIMENTS

The present invention will now be described in detail with reference to the drawings showing an embodiment thereof.

Figure 1:
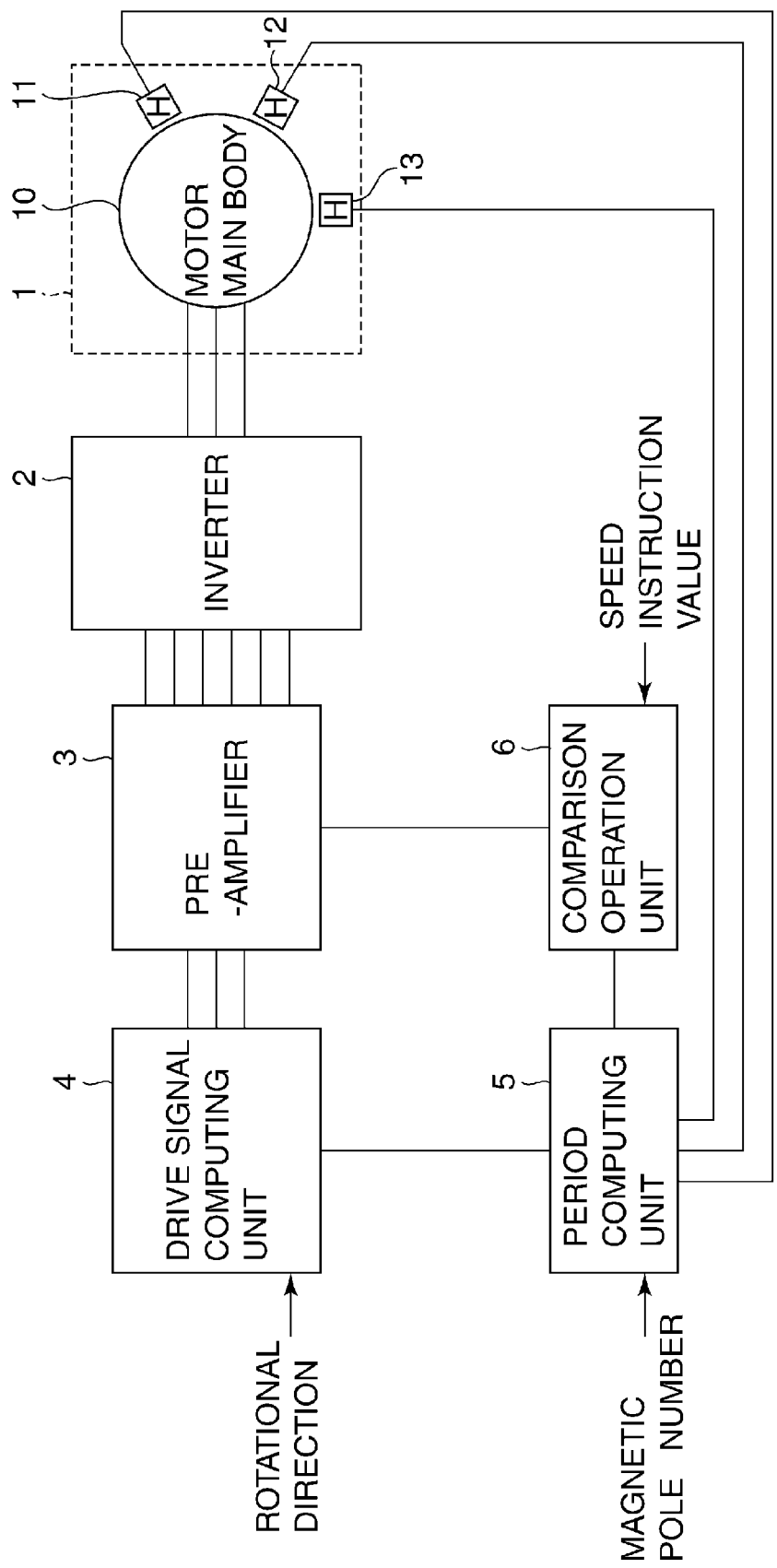
FIG. 1 is a block diagram showing a control system of a motor drive apparatus according to an embodiment of the present invention.

FIG. 1 is a block diagram showing a control system of a motor drive apparatus according to a first embodiment of the present invention. A DC brushless motor 1 driven by the motor drive apparatus is comprised of a motor main body 10 having a three-phase n-pole structure, and magnetic pole detecting elements 11, 12, and 13.

The motor main body 10, although a detailed arrangement of which is not shown in FIG. 1, has a coil unit in which coils are wound around respective slots of a laminated core having a plurality of cores, and a rotor magnet having magnets with n poles (magnetic pole number: n) fixed to a rotary shaft. Specifically, the coil unit has an exemplary structure in which coils are wound around four slots per one phase in a laminated core having twelve slots. The rotor magnet has an exemplary structure having magnets with eight poles fixed to a rotary shaft.

The magnetic pole detecting elements 11, 12, and 13, which are hall elements for detecting magnetic poles, detect the rotational position of the rotor magnet. In the present embodiment, the magnetic pole detecting elements 11, 12, and 13 are arranged at electric angular intervals of 120 degrees at such positions as to be able to detect magnetic poles.

The motor drive apparatus appearing in FIG. 1 has an inverter 2 comprised of six FETs that supply electrical power to the DC brushless motor 1, and a pre-amplifier 3 that outputs gate signals for driving these six FETs. The motor drive apparatus also has a drive signal computing unit 4 that outputs three-phase sine wave drive signals as drive current, a period computing unit 5 that computes the period of a sine wave drive signal, and a comparison operation unit 6 that compares an actual speed for the DC brushless motor 1 with a speed instruction value (described hereinafter).

It should be noted that the motor drive apparatus, although not shown in FIG. 1, has a magnetic pole number selection unit, such as a switch, which selects the magnetic pole number n of the DC brushless motor 1, and the magnetic pole number n set by this switch is input to the period computing unit 5. The speed instruction value (signal) that designates a rotation speed for the DC brushless motor 1 is input from a speed instruction setting unit, not shown, to the comparison operation unit 6.

Figure 2:
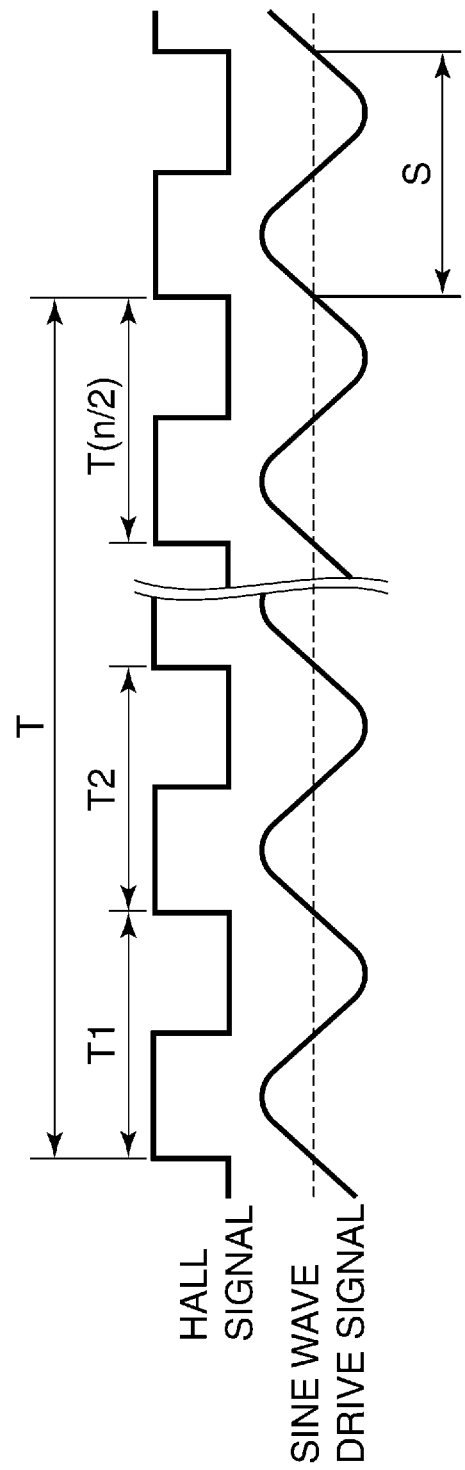
FIG. 2 is a waveform chart of a sine wave drive signal for driving a DC brushless motor by the motor drive apparatus appearing in FIG. 1.

FIG. 2 is a waveform chart of a sine wave drive signal for driving the DC brushless motor 1 by the motor drive apparatus after the DC brushless motor 1 has been started. The magnetic pole detecting elements 11, 12, and 13 send hall signals as output signals to the period computing unit 5. At the start of the DC brushless motor 1, the starting current is controlled so as to obtain a rotational direction and a rotational speed set based on information on a rotational position of the rotor magnet detected by the magnetic pole detecting elements 11, 12, and 13, and moreover this starting current can be controlled using a commonly-known technique.

After the DC brushless motor 1 has been started, the period computing unit 5 computes one rotational period T of the rotor magnet based on hall signal periods [T1, T2, ..., T(n/2)] for half the magnetic pole number n as shown in FIG. 2, and outputs the one rotational period T to the comparison operation unit 6. The period computing unit 5 also computes one period S of the sine wave drive signal based on the one rotational period T of the rotor magnet and the magnetic pole number n according to the mathematical expression of "S=T/(n/2)", and outputs the one period S to the drive signal computing unit 4.

Based on an amplitude value, which is obtained by dividing an amplitude value of the sine wave drive signal in 480, and an instruction value of the rotational direction, the drive signal computing unit 4 outputs three-phase sine wave drive signals which are out of phase with each other by an electric angle of 60 degrees. On the other hand, the comparison operation unit 6 calculates a correction value by comparing the one rotational period T of the rotor magnet with the speed command value, and outputs the calculated correction value to the pre-amplifier 3. Based on the three-phase sine wave drive signals input from the drive signal computing unit 4 and the correction value input from the comparison operation unit 6, the pre-amplifier 3 outputs FET gate signals with duty ratios for appropriate PWM driving to the inverter 2.

The six FETs of the inverter 2 are driven by the gate signals received from the pre-amplifier 3, and supply electrical power to the DC brushless motor 1. The comparison operation unit 6 updates the one rotational period T of the rotor magnet at intervals of one hall signal period, and at the same time, updates the one period S of the sine wave drive signal.

Thus driving the DC brushless motor 1 cancels variations in the period of hall signals detected by the magnetic pole detecting elements, which are caused by lack of accuracy of division in magnetization of the rotor magnet. Also, by configuring the motor drive apparatus according to the present invention so as to enable the magnetic pole number of the rotor magnet to be set, it is possible for the motor drive apparatus according to the present invention to be used to drive a wide range of brushless motors without any limit to the magnetic pole number of the rotor magnet.

In the above embodiment, the one rotational period T of the rotor magnet is obtained using the output signal (hall signal) from any one of the magnetic pole detecting elements 11, 12, and 13. The one rotational period T of the rotor magnet should not necessarily be obtained in this manner, but may be obtained by providing the DC brushless motor 1 with an encoder which detects the rotational period of the rotor magnet.

The encoder may be of various types such as a light-transmitting type, a light-reflecting type, and a magnetic type, but any type may be used without any specific limitations. In this case, based on a signal from the encoder, one rotational period T indicating that the rotor magnet has made one rotation is obtained. A method to compute and update one period S of a sine wave drive signal is the same as the one in the above embodiment, and therefore, description thereof is omitted here. In this variant embodiment as well, the same effects as those obtained in the above embodiment can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-058046, filed Mar. 16, 2011, which is hereby incorporated by reference herein in its entirety.

What is claimed is:

1. A motor drive apparatus comprising:
a rotor magnet including magnets with a magnetic pole number n fixed to a rotary shaft;
a magnetic pole detecting element that detect a rotational position of the rotor magnet;
a drive signal output unit configured to output a sine wave drive signal;
an obtaining unit configured to obtain one period S of a sine wave drive signal and to output the one period S to the drive signal output unit,
wherein the obtaining unit comprises a period computing unit configured to compute one rotational period T of the rotor magnet based on the output signal periods of the magnetic pole detecting element for half the magnetic poles number n, and
wherein the obtaining unit obtains the one period S of the sine wave drive signal according to a mathematical expression of S=T/(n/2), and
wherein the obtaining unit updates the one rotational period T of the rotor magnet at interval of the output signal period of magnetic pole detecting element, and updates the one period S of the sine wave drive signal.

* * * * *